Oct. 24, 1939.  R. SAIBARA ET AL  2,177,346

EXPLORATION BY INCREMENTAL WAVE DISTORTION

Filed April 18, 1938

ROBERT SAIBARA
SOLOMON BILINSKY
WELDON G. McLARRY
INVENTORS.

BY Jesse R. Stone
Lister B. Clark
ATTORNEYS.

UNITED STATES PATENT OFFICE 2,177,346

EXPLORATION BY INCREMENTAL WAVE DISTORTION

Robert Saibara, Solomon Bilinsky, and Weldon G. McLarry, Houston, Tex., assignors to E. E. Rosaire, Houston, Tex.

Application April 18, 1938, Serial No. 202,656

12 Claims. (Cl. 175—182)

This invention relates to geophysical exploration by electrical methods and pertains particularly to that branch of the art in which the wave form of a wave is distorted by the passage of the electric wave through the earth, and the amount of distortion constitutes a measure of geological conditions.

It has been proposed to utilize electrical transients in the earth or periodic electric waves in such form that the distortion produced by the earth may be measured and used for the determination of geological anomalies. The present invention is applicable to either of the above mentioned methods of electrical prospecting and offers a simplification thereof both as to method and apparatus.

The principle of this invention consists of causing a wave of current to flow in the earth, detecting the potential caused by this current with a device wherein the wave form may be observed, and interposing between the point of detection and the point of observation a distorting network which is so adjustable that a wave of standard shape is observed. Thus, if the earth distorts the wave by an amount which is desired to be measured, the amount of additional distortion caused by the network to produce a standard wave shape may be used as a measure of the distortion produced by the earth.

The general method of exploration to which the invention is applicable may be termed the wave distortion method, for whether transients or periodic waves are used, the observed variable is the distortion of the wave shape. In the past this distortion has been measured by comparison with or opposition by another wave whose shape can be altered at will, by direct observation or recording, or by balancing with a plurality of earth currents in variable geometric relation. The present invention differs from this art in that it consists in subjecting the wave to such further distortion that a standard, readily recognized, wave shape is produced so that the amount of additional distortion provides a measure of the initial distortion produced by the earth.

In accordance with the foregoing it is an object of the invention to simplify means and method in the wave distortion method of exploration.

Another object is the simplification of measurements whereby both field and computation technique are expedited.

Another object is the reduction in the skill required of operators and a reduction in personal error incident to the practice of known methods.

Specifically, an object is to eliminate the necessity for comparison of opposition voltages, and the complicated generating, synchronizing and distorting networks incident thereto.

Still another object is the elimination of opposition currents of complicated wave shape, either generated locally at the point of detection or generated in a second region of the earth. It is contemplated however that a potential of predetermined wave shape may be superimposed upon the detected wave but without the necessity of complicated generated, synchronizing and distorting networks above mentioned. It is hence a further object to provide such potential superposition by simple means.

An advantage of the present invention lies in the fact that high frequency components of the incoming voltage are attenuated with the result that electrical noises due to momentary transients arising from natural earth currents are almost completely eliminated. Also, in areas where power line interference is ordinarily troublesome, the frequency discrimination in the networks employed reduce the effect of the fundamental and the third and fifth harmonics (the most troublesome) so that exploration may be carried out in proximity to such sources of interference. Thus another object of the invention is to provide discrimination against interfering electrical noises.

A further object is to measure the wave shape in numerical terms such as the time constant.

These and other objects will become evident from the description taken in connection with the drawing in which.

Figure 1:
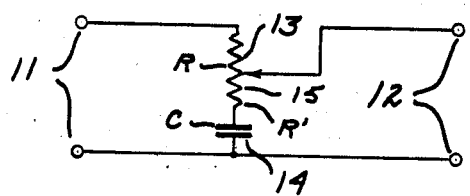
Fig. 1 shows one form of the essential network used in the invention.

In Fig. 1 the input terminals 11 are shown as connected to a resistor 13, having a total resistance R, and a capacitor 14, having a capacitance C. One of the output terminals 12 is connected the capacitor 14 while the other of the output terminals is slidably connected to the resistor 13 so that a variable portion 15 of the resistor 13 having a resistance R' is in series with the capacitor 14 between the output terminals 12.

Figure 4:
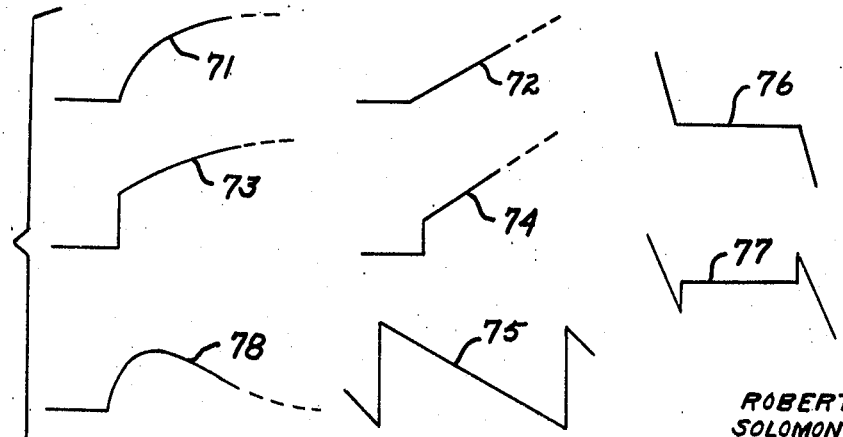
Fig. 4 shows a series of wave forms which are used to explain the performance of the invention.

If an electrical transient whose wave form is a simple exponential, as shown by curve 71 in Fig. 4, and expressible as $$e_1 = E(1 - \epsilon^{-\alpha t})$$

is impressed on terminals 11, the shape of the wave appearing at terminals 12 will be modified as will be shown later. If the product of $R_1$ and C is adjusted so that $$R_1 C = \frac{1}{\alpha}$$

then the wave form at the terminals 12 will be a simple exponential of the form $$e_2 = E\left(1 - \epsilon^{-\frac{1}{RC}t}\right)$$

If the product of R and C is made large compared to the amount of time during which the wave is observed, the wave shape of $e_2$ is a close approximation to a straight line, as indicated by 72 in Fig. 4. Thus, if the wave shape is observed while $R_1$ is being adjusted, and the adjustment performed so that the observed wave shape is that of 72 in Fig. 4, then the time constant $\alpha$ of the incoming wave can be determined directly from the values of $R_1$ and C.

The manner in which the circuit of Fig. 1 performs the function of modifying the incoming wave to produce a straight line may be explained by the following analysis: Let $$\beta = \frac{1}{RC} \text{ and } \tau = \frac{R_1}{R}$$

The voltage response at terminals 12 due to a unit step voltage at terminals 11 is $$A(t) = 1 - (1 - \tau)\epsilon^{-\beta t} \quad (1)$$

The response $E(t)$ at terminals 12 to an arbitrary voltage $e(t)$ at terminals 11 where $e(o) = 0$ and $$e'(t) = \frac{d}{dt}e(t)$$

is $$E(t) = \int_0^t A(t - \lambda)e'(\lambda)d\lambda \quad (2)$$

from the well known superposition theorem (see for example, V. Bush "Operational Circuit Analysis", McGraw Hill, 1932, equation 77). When $e(t)$ is a simple exponential, that is when $$e(t) = 1 - \epsilon^{-\alpha t}$$
$$e'(t) = \alpha \epsilon^{-\alpha t}$$
$$e'(\lambda) = \alpha \epsilon^{-\alpha \lambda}$$

then equation (2) becomes $$E(t) = 1 - \epsilon^{-\beta t} + \frac{\tau - \beta/\alpha}{1 - \beta/\alpha}(\epsilon^{-\beta t} - \epsilon^{-\alpha t}) \quad (3)$$

The adjustment which makes $$\tau = \beta/\alpha, \text{ or } \frac{1}{R_1 C} = \alpha$$

causes the last term to drop out so the wave form of the output voltage $E(t)$ is a simple exponential whose time constant is $1/\beta$. If $1/\beta$ is made large enough, that is $R_1/R \ll 1$ then the response $E(t)$ is practically a straight line 72 in Fig. 4.

Thus the operator in determining the time constant of the incoming wave adjusts $R_1$ until the wave seen on the indicator is recognizably a straight line, and then reads off the value of $R_1$ from which value and the known value C the time constant $1/\alpha = R_1 C$ is found.

Figure 3:
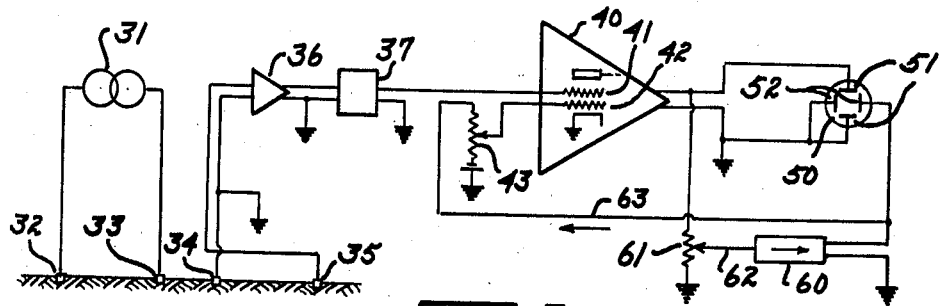
Fig. 3 shows the manner of employment of the invention for geophysical exploration.

The manner of use in geophysical exploration is illustrated in Fig. 3. A generator 31 causes an electric current, preferably of rectangular wave form, to flow in the earth between electrodes 32 and 33. This current may be the familiar unit function transient, or an intermittent or periodic current which, if the wave form be rectangular, can be treated mathematically and explained in terms of the simple transient. Detection electrodes 34 and 35 are arranged between spaced points in the earth and provide the potential which is amplified in the amplifier 36 which serves the dual-purpose of providing some gain, and providing a constant impedance for its load circuit. Load circuit 37 is the incremental distorting circuit illustrated in Fig. 1. Further amplification in amplifier 40 raises the level a sufficient amount to actuate oscillograph 50, here illustrated as a cathode-ray oscilloscope having vertical plates 51 and horizontal plates 52. A conventional sweep voltage generator 60 is provided to apply a desired potential between the horizontal plates 52 and a sweep lock control 61 is preferably included. Such sweep circuits are well known in the art of cathode ray oscillography.

It was above pointed out that the modified wave 72 of Fig. 4 is approximately a straight line. By a simple expedient the degree of approximation may be made very close by adjusting the sweep voltage generator 60 which feeds the horizontal deflection plates 52. It should be noted that this wave is really an exponential with a long time constant so that it is very slightly concave downwards.

If the product of resistance and capacitance in the sweep generator circuit is made equal to the product of resistance and capacitance in the circuit of Fig. 1, this curvature is removed and the resultant line is exactly straight within the limitations of other sources of distortion.

In operation, pure exponential earth waves are rarely encountered. The wave usually can be approximated only by the sum of several exponentials. Practically, it has been found that those components having the shorter time constants are negligible except insofar as they sum up to produce a wave of the form 73 in Fig. 4. For exploration purposes this wave may be treated as the sum of a rectangular wave and an exponential. The actual resultant obtained with the circuit of Fig. 1 is the wave shape 74 of Fig. 4.

By a simple expedient, the final adjustment may be made to produce a horizontal resultant wave as shown in curve 76 or 77 of Fig. 4. In the normal operation of a cathode ray oscillograph the sweep circuit 60 of Fig. 3 is provided which furnishes a saw-tooth wave shape as shown in curve 75 of Fig. 4. This wave, being readily available in the usual equipment, may be introduced in proper magnitude and phase so that the superposition of curve 75 upon curve 72 or 74 results in curve 76 or 77.

The resultant wave shape being horizontal over the interval of interest is capable of more critical observation and consequently the adjustment of circuit 37 (as shown in detail in Fig. 1) by which the measurement of the wave is made becomes more critical; in other words the accuracy is increased.

One way in which the sweep circuit wave may be superposed upon the adjusted wave is illustrated in Fig. 3 in which the output of the sweep wave is fed back through a line 63, a suitable amplitude control 43, and a control element 42 of a stage in amplifier 40. Obviously, instead of using the sweep oscillator 10 for this purpose, another saw-tooth oscillator may be provided at the expense of added complexity and the possibility that the wave shapes of two such oscillators may not be as nearly similar as desired.

Figure 2:
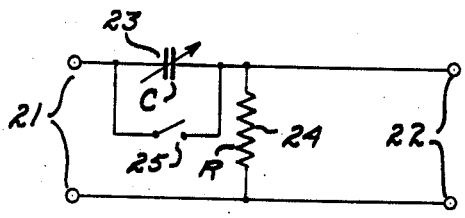
Fig. 2 shows an alternative form of the essential network.

An alternative modifying network is shown in Fig. 2 which may be used in the stead of that shown in Fig. 1 as the unit 37 in Fig. 3. In this embodiment the input terminals 21 and the output terminals 22 are connected to the terminals of the resistor 24 having a resistance R. A variable capacitor 23 having a capacitance C is connected in the lead from one of the input terminals 21 and is provided with a short circuiting switch 25 for a purpose that will be made apparent.

The wave form resulting from the use of this modified network is that shown by curve 75 in Fig. 4 and the amplitude of this wave, expressed as a fraction of the maximum without the network bears a definite relation to the product of R and C and the time constant of the incoming wave. Taking the maximum amplitude of the unmodified wave as unity, the maximum amplitude of the modified wave is $$E_{max} = \left(1 - \frac{\beta - \alpha}{\beta}\right)^{\frac{\beta}{\beta - \alpha}}$$

where $$\beta = \frac{1}{RC} \text{ and } \alpha =$$

time constant of the incoming wave.

The analysis is as follows: Using Equation 2 and using $$A(t) = \epsilon^{-\beta t}$$
$$e(t) = 1 - \epsilon^{-\alpha t}$$

applied to terminals 21, then $$E = \alpha \epsilon^{-\beta t} \int_0^t e^{(\beta - \alpha)\lambda} d\lambda = \frac{\alpha \epsilon^{-\beta t}}{\beta - \alpha}[\epsilon^{(\beta - \alpha)t} - 1] \quad (4)$$

E is a max when $$\frac{dE}{dt} = 0$$

or when $$t = \frac{1}{\beta - \alpha} \log \frac{\beta}{\alpha} \quad (5)$$

Let $$x = \frac{\beta - \alpha}{\beta}$$

then $$E_{max} = (1 - x)^{\frac{1}{x}}$$

When $\beta = \alpha$, that is when $x = 0$, $E_{max} = \frac{1}{\epsilon} = 0.368$ If $\beta$ is made some other value with respect to $\alpha$, the $E_{max}$ will have some value other than .368; in fact $E_{max}$ may be made to have any arbitrary value from 0 to 1 per unit value of the maximum value of the impressed wave.

In practice, the wave 75 in Fig. 4 is caused, by adjusting R or C in Fig. 2, to have some arbitrary amplitude with respect to the incoming wave. Then the product of R and C which is equal to $$\frac{1}{\beta}$$

may be used to compute $\alpha$. If the arbitrary amplitude is .368 per unit of the amplitude of the incoming wave, then $\alpha = \beta$, and the time constant of the incoming wave has the same time constant as the value RC to which the circuit of Fig. 2 has been adjusted.

For measuring the amplitude of the incoming wave, to serve as a basis of comparison for determining the relative amplitude of the modified wave, the capacitor 23 may be shorted by means of switch 25 in Fig. 2, and the size of the wave on the indicator screen observed.

From the following table of values, $\alpha$ may be computed in terms of the time constant RC of the network for the various values of $E_{max}$.

| $E_{max}$ | $\alpha/\beta$ |
| --- | --- |
| .630 | 4 |
| .5 | 2 |
| .368 | 1 |
| .25 | 1/2 |

Obviously, instead of the resistance-capacitance combination, a suitable inductance-resistance network may be used for the modifying circuit.

What is claimed is:

1. In the art of exploration for geological structure by causing an electric current to flow in the earth and observing the wave distortion of potential detected in the area subject to the current the improvement comprising subjecting the detected potential to an adjustable additional distortion, observing the resultant wave shape, and varying the additional distortion until the resulting wave approaches a predetermined wave shape over at least a portion of the time during which the amplitude varies.

2. The method of measuring the electrical time constant of the earth which comprises causing an impulse of electric current to flow in the earth, detecting the potential in a region subject to said current, subjecting the detected potential to adjustable distortion, observing the resulting wave shape, and varying the distortion until a standard predetermined wave shape is approximated over a period of time.

3. The method of measuring the electrical time constant of a part of the earth's crust which comprises causing periodic impulses of electric current to flow in the earth, detecting the potential in a region subject to said current, subjecting the detected potential to an adjustable distortion, observing the resulting wave shape, and adjusting the distortion until a predetermined wave shape is approximated over at least a portion of the period.

4. In the art of exploration for geological structure by causing an electric current to flow in the earth and observing the wave distortion of potential detected in the area subject to the current, the improvement which comprises subjecting the detected potential to an adjustable additional distortion, varying such additional distortion until the resulting wave approaches a predetermined wave shape over at least a portion of the time during which the amplitude varies, and producing a record of the wave under at least one condition of variation of the additional distortion.

5. The method of measuring the time constant of an electrical phenomenon comprising impressing the potential exhibited by the phenomenon on a suitably adjustable network capable of modifying the potential wave shape, impressing the so modified potential on a wave shape indicating instrument, and varying the network adjustment until the indicated wave shape approximates a predetermined wave shape.

6. The method of measuring the time constant of an electrical phenomenon comprising the steps of impressing the potential exhibited by the phenomenon upon a circuit having an adjustable time constant, detecting the potential across at least a part of the circuit, and adjusting the time constant until the detected maximum or crest potential is a specified fraction of the steady state potential exhibited by the phenomenon.

7. The method of determining the electrical time constant of the earth comprising, causing a current impulse to flow in the earth, detecting the potential in the region subject to the current, impressing the detected potential upon a circuit having an adjustable time constant, and varying the time constant of such circuit until the observed wave has a maximum or crest amplitude which bears a predetermined relation to the maximum amplitude of the unmodified wave.

8. The method of determining the electrical time constant of the earth comprising the steps of passing a current through the earth, detecting the potential in the region subjected to the current, adjustably distorting the wave shape of the detected potential, and superposing upon the so distorted wave a modifying wave of such form that the adjustable distortion may be critically varied to produce a predetermined wave form.

9. The method of geophysical exploration comprising establishing a flow of electricity in the earth, detecting the potential in the region subjected to the current, adjustably distorting the wave shape of the detected potential, and superposing thereon a modifying wave of a form to effect critical distortion adjustment to produce a predetermined wave form.

10. Apparatus for measuring the time constant of a phenomenon, said phenomenon being a function of a unit impulse modified by an amount of distortion to be determined, said apparatus comprising means for detecting an electromotive force exhibited by the phenomenon, adjustable circuit means for further distorting the wave shape of the electromotive force until a predetermined wave shape is obtained and means for exhibiting the so distorted wave shape.

11. A combination for geophysical measurement comprising means for passing an electric current in the earth, means for detecting potential in the area subjected to the current, and means for adjustibly distorting the wave shape of the detected potential until the resulting wave approaches a predetermined wave shape so that the measure of distortion is an indication of geological structure.

12. A combination for geophysical measurement comprising means for passing a current in the earth, means for detecting potential in the area subjected to the current, and means for adjustably distorting the wave shape of the detected potential, said last mentioned means including a circuit having a variable time constant whereby the resultant wave shape may be made to approach a predetermined wave form.

ROBERT SAIBARA.
SOLOMON BILINSKY.
WELDON G. McLARRY.